No. 800,923. PATENTED OCT. 3, 1905.
J. H. KINSMAN.
RUNNING GEAR.
APPLICATION FILED JAN. 13, 1905.
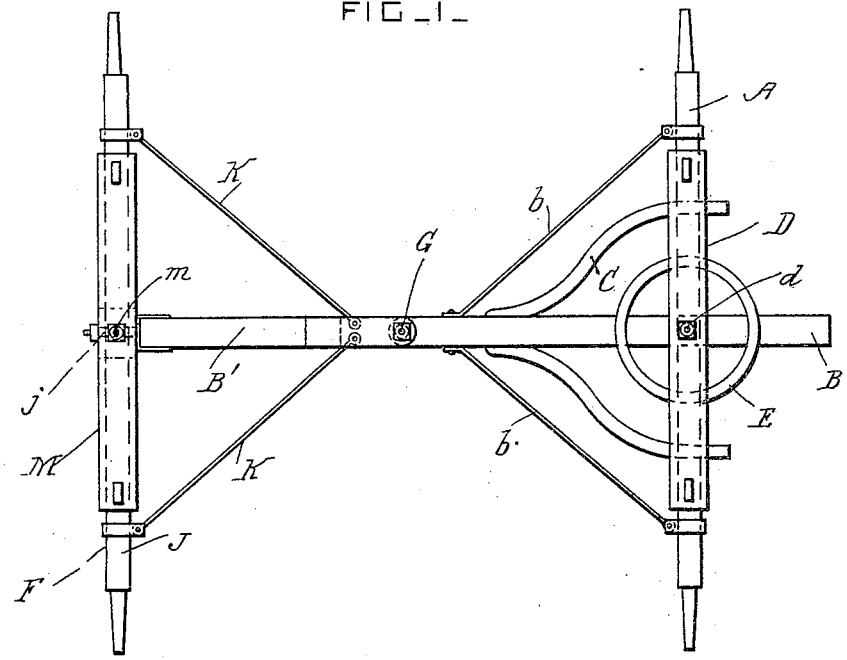
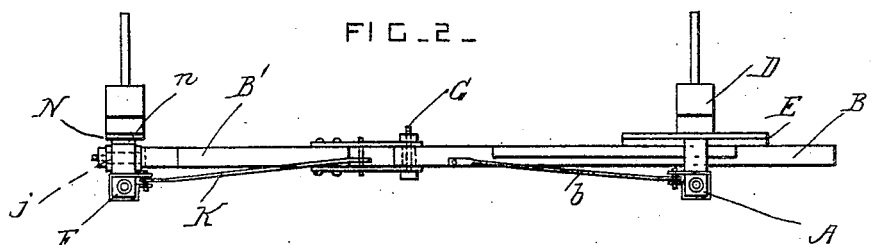
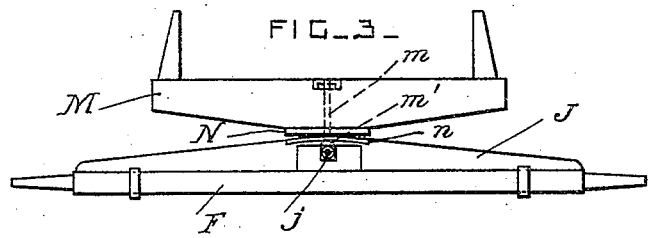
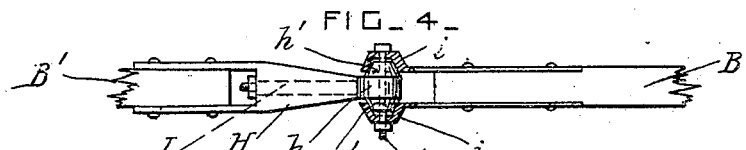
WITNESSES:
Walter Donaldson
L. B. Middleton
INVENTOR
Joel H. Kinsman
By Herbert W. T. Jenner
Attorney

UNITED STATES PATENT OFFICE.

JOEL H. KINSMAN, OF PALMETTO, FLORIDA.

RUNNING-GEAR.

No. 800,923.      Specification of Letters Patent.      Patented Oct. 3, 1905.

Application filed January 13, 1905. Serial No. 240,911.

*To all whom it may concern:*

Be it known that I, JOEL H. KINSMAN, a citizen of the United States, residing at Palmetto, in the county of Manatee and State of Florida, have invented certain new and useful Improvements in Running-Gear; and I do hereby declare the following to be a full, clear, and exact description of the invention, such as will enable others skilled in the art to which it appertains to make and use the same.

This invention relates to running-gear for wagons and other vehicles; and it consists in the novel construction and combination of the parts hereinafter fully described and claimed.

In the drawings, Figure 1 is a plan view of the running-gear. Fig. 2 is a side view of the running-gear. Fig. 3 is a front end view of the running-gear. Fig. 4 is a detail view of the coupling between the two parts of the reach.

A is a rear axle of any approved construction.

B is the rear part of the reach, which is secured to the rear axle A by braces $b$, and C represents the hounds, also secured to the rear axle.

D is the rear bolster, which is connected with the rear axle by a vertical pivot-pin $d$, and E is a fifth-wheel or circle of any approved construction between the rear axle and the rear bolster.

F is the front axle, which is of any approved construction, and B' is the front part of the reach, which is operatively connected with the front axle.

The two parts B B' of the reach are connected together by a vertical pivot-pin G so that the two axles can be placed at an angle to each other to enable the vehicle to be turned around in a short space.

In light vehicles it is preferable to form the coupling between the two parts of the reach, as shown in detail in Fig. 4. The front part B' of the reach has a forked socket H secured to it, and $h$ is a coupling member provided with two conical projections $h'$.

The coupling member $h$ has a longitudinal pivot-pin I, which is journaled in the end portion of the socket H so that the coupling member $h$ may move axially. The rear portion of the reach is provided with two conical sockets $i$, which engage with the conical projections $h$, and the coupling-pin G passes vertically through the said sockets and projections.

J is the cap of the front axle, which is secured to it in any approved manner. The front part B' of the reach has a longitudinally-arranged pivot-pin $j$, which is journaled in the front axle-cap. When a pivot-pin I is provided at the reach-coupling the pivot-pin $j$ may be dispensed with; but both pivot-pins may be used if desired.

K represents braces between the front axle and the front part of the reach. These braces are flexible, being formed of resilient material or otherwise constructed or attached so that the rear part of the reach may be free to move pivotally of the front axle to a limited extent. This construction enables a wheel of one axle to pass over a large stone or other obstruction on the road without straining the gearing at the other axle.

M is the front bolster, and $m$ is a king-bolt arranged vertically and connecting the front bolster with the axle-cap. The king-bolt is provided with a ball-head $m'$, which fits under a curved plate $n$ on the top of the axle-cap so as to allow the front axle to rock to a limited extent.

N is a plate on the bolster.

What I claim is—

1. In a short-turning gear, the combination, with a front axle, a rear axle, and a reach formed of two parts which are connected with the said axles respectively; of a socket secured to one end of one reach member and provided with a longitudinal hole, two conical sockets secured to the adjacent end of the other said reach member and arranged vertically one above the other, and a coupling member having two conical projections which are pivoted in the said conical sockets and having also a longitudinal pin which is pivoted in the said longitudinal hole.

2. In a short-turning gear, the combination, with an axle and an axle-cap secured above the said axle; of a reach member provided with a longitudinal pin at one end which is journaled in a hole in the said axle-cap, and flexible braces arranged between the end portions of the said axle and the other end portion of the said reach member and permitting it to move axially to a limited extent.

In testimony whereof I have affixed my signature in the presence of two witnesses.

JOEL H. KINSMAN.

Witnesses:
     JNO. W. JACKSON,
     J. B. OWEN.